United States Patent
Johnson

(10) Patent No.: US 10,338,209 B2
(45) Date of Patent: Jul. 2, 2019

(54) SYSTEMS TO TRACK A MOVING SPORTS OBJECT

(71) Applicant: EDH US LLC, Orlando, FL (US)

(72) Inventor: Henri Johnson, Windermere, FL (US)

(*) Notice: Subject to any disclaimer, the term of this patent is extended or adjusted under 35 U.S.C. 154(b) by 429 days.

(21) Appl. No.: 15/141,569

(22) Filed: Apr. 28, 2016

(65) Prior Publication Data

US 2016/0320476 A1 Nov. 3, 2016

Related U.S. Application Data

(60) Provisional application No. 62/153,574, filed on Apr. 28, 2015.

(51) Int. Cl.
*G01S 7/292* (2006.01)
*G01S 13/72* (2006.01)
(Continued)

(52) U.S. Cl.
CPC ............ *G01S 13/72* (2013.01); *G01S 3/7864* (2013.01); *G01S 7/2955* (2013.01); *G01S 7/4026* (2013.01); *G01S 13/58* (2013.01); *G01S 13/726* (2013.01); *G01S 13/867* (2013.01); *G06T 7/20* (2013.01); *G06T 7/246* (2017.01); *G06T 7/80* (2017.01); *A63B 2220/16* (2013.01);
(Continued)

(58) Field of Classification Search
CPC .......... A63B 2220/16; A63B 2220/806; A63B 2220/89; G01S 13/58; G01S 13/72; G01S 13/726; G01S 13/867; G01S 13/88; G01S 3/7864; G01S 7/2955; G01S 7/4026; G06T 2207/30221; G06T 7/20; G06T 7/246; G06T 7/80

USPC .......................................................... 342/55
See application file for complete search history.

(56) References Cited

U.S. PATENT DOCUMENTS 2,696,052 A  12/1954  Czarnikow
6,091,355 A   7/2000  Cadotte et al.
(Continued)

FOREIGN PATENT DOCUMENTS

EP       0108048 A1     5/1984
WO   WO-2006002639 A1   1/2006
(Continued)

OTHER PUBLICATIONS

"Hawk-Eye", (2012), 13 pgs.
(Continued)

*Primary Examiner* — Timothy A Brainard

(57) ABSTRACT

Systems, methods and computer-readable media are provided for tracking a moving sports object. In one example, a method of tracking a moving sports object includes calibrating a perspective of an image of a camera to a perspective of a Doppler radar for simultaneous tracking of the moving sports object, and tracking the moving sports object simultaneously with the camera and Doppler radar. The method may further comprise removing offsets or minimizing differences between simultaneous camera measurements and Doppler radar measurements of the moving sports object. The method may also include combining a camera measurement of an angular position of the moving sports object with a simultaneous Doppler measurement of a radial distance, speed or other measurement of the moving sports object.

16 Claims, 13 Drawing Sheets

(51) Int. Cl.

| | | |
|---|---|---|
| *G01S 3/786* | (2006.01) | |
| *G01S 7/295* | (2006.01) | |
| *G01S 7/40* | (2006.01) | |
| *G01S 13/58* | (2006.01) | |
| *G01S 13/86* | (2006.01) | |
| *G06T 7/20* | (2017.01) | |
| *G06T 7/80* | (2017.01) | |
| *G06T 7/246* | (2017.01) | |
| *G01S 13/88* | (2006.01) | |

(52) U.S. Cl.
CPC ..... *A63B 2220/806* (2013.01); *A63B 2220/89* (2013.01); *G01S 13/88* (2013.01); *G06T 2207/30221* (2013.01)

(56) References Cited

U.S. PATENT DOCUMENTS

| | | | |
|---|---|---|---|
| 6,154,250 | A | 11/2000 | Honey et al. |
| 6,233,007 | B1 | 5/2001 | Carlbom et al. |
| 6,304,665 | B1 | 10/2001 | Cavallaro et al. |
| 6,520,864 | B1 | 2/2003 | Wilk |
| 8,189,857 | B2 | 5/2012 | Johnson et al. |
| 2008/0199043 | A1 | 8/2008 | Forsgren |
| 2009/0067670 | A1* | 3/2009 | Johnson ............. A63B 71/0605 382/100 |
| 2009/0262137 | A1 | 10/2009 | Walker et al. |
| 2010/0026809 | A1 | 2/2010 | Curry |
| 2011/0286632 | A1* | 11/2011 | Tuxen ................ A63B 24/0021 382/103 |
| 2013/0346009 | A1 | 12/2013 | Winter et al. |

FOREIGN PATENT DOCUMENTS

| | | |
|---|---|---|
| WO | WO-2006002640 A1 | 1/2006 |
| WO | WO-2010086414 A2 | 8/2010 |
| WO | WO-2015084937 A1 | 6/2015 |
| WO | 2016176487 | 11/2016 |
| WO | WO-2016176487 A1 | 11/2016 |

OTHER PUBLICATIONS

"TRACAB image tracking system", [Online]. Retrieved from the Internet: <URL: http://tracab.hegogroup.com/technology.aspx>, (2012), 2 pgs.

Anderson, Spencer, "Forsgren helps revolutionize golf on TV with Protracer", (Jul. 11, 2013), 2 pgs.

Collins, Harry, et al., "You cannot be serious! Public understanding of technology with special reference to "Hawk-Eye"", Public Understanding of Science, 17, (2008), 283-308.

Tewhatu, Matt, "Statcast to change the face of the MLB", [Online]. Retrieved from the Internet: <URL: http://digitalsport.co/statcast-to-change-the-face-of-the-mlb>, (Sep. 30, 2015), 8 pgs.

Warthman, K L, "Project Echo—Boresight Cameras for Recording Antenna Pointing Accuracy", NASA Technical Note D-1138. Bell Telephone Laboratories, (Sep. 1961), 14 pgs.

"International Application Serial No. PCT/US2016/029848, International Preliminary Report on Patentability dated Nov. 9, 2017", 10 pgs.

"Application Serial No. PCT/US2016/029848, Invitation to Pay Add'l Fees and Partial Search Rpt dated Jul. 12, 2016", 8 pgs.

"International Application Serial No. PCT/US2016/029848, International Search Report dated Sep. 5, 2016", 5 pgs.

"International Application Serial No. PCT/US2016/029848, Written Opinion dated Sep. 5, 2016", 8 pgs.

\* cited by examiner

COORDINATES WITH RADAR AND ALIGNMENT APPARATUS

CAMERA YAW ALIGNMENT

EXAMPLE INPUT KERNEL FOR EROSION IMAGE PROCESSING

REMOVAL OF RESIDUAL CAMERA AND RADAR OFFSETS

SYSTEMS TO TRACK A MOVING SPORTS OBJECT

CROSS-REFERENCE TO RELATED APPLICATIONS

This application claims the benefit of priority of U.S. Patent Application Ser. No. 62/153,574, filed on Apr. 28, 2015, which is herein incorporated by reference in its entirety.

BACKGROUND

Current camera based systems used to track or trace the trajectories of sports objects suffer from all the known shortcomings of image processing. For example a golf ball may be difficult to detect or measure in a camera image due to contrast, ambient light conditions, and camera resolution. Current systems that provide traces of ball flight on television feeds or tennis ball trajectories for line calling decisions use image processing techniques to find the ball in successive images and to construct a trace or trajectory from such finds. Apart from being able to animate the television images with traces of the ball flight, accurate data such as positions, speeds or spin rates are not readily available from such systems.

Current radar based systems used to track sports objects suffer from other shortcomings unique to radar technology. For example the vertical angular position or height of an object at low elevation can be severely affected by multipath effects.

There is a need to improve both camera and radar tracking systems for sports objects.

BRIEF SUMMARY

The present subject matter includes a method to improve the accuracy with which a moving sports object is tracked. The present subject matter can provide information for a graphic visualization of a sports object such as a ball, bat or instrument, trajectory, or flight data for visual display or to a television feed. The present subject matter improves camera tracking of an object by providing rather than predicting the area of interest to the image processing function. The present subject matter improves camera tracking of an object by extending the achievable tracking distance. The present subject matter overcomes or at least addresses temporary or permanent loss of track of an object. The present subject matter improves radar tracking of an object by providing more precise angular and height measurements of an object than is achievable by radar alone. In certain embodiments, the present subject matter uses a ball-tracking 3D Doppler radar together with a camera to track a sports object, measuring the object trajectory and other object data including but not limited to distance, flight path, launch angles, impact angles, impact positions, speeds, and spin rates. A two-dimensional video image, for example a color dot, line, or a trace of dots or lines, can be generated to represent the object's instantaneous position or trajectory in the perspective view of the camera. This is done synchronously with the camera's frame rate. A video image of the trajectory can be mixed with the clean camera feed to animate television feeds with the radar-measured object data. In addition, a measured position, speed and spin rate of the tracked sports object at each time step can be associated with animated television images.

In one example embodiment, a method of tracking a moving sports object includes calibrating a perspective of an image of a camera to a perspective of a Doppler radar for simultaneous tracking of the moving sports object, and tracking the moving sports object simultaneously with the camera and Doppler radar. The method may further comprise removing offsets or minimizing differences between simultaneous camera measurements and Doppler radar measurements of the moving sports object. The method may further comprise combining a camera measurement of an angular position of the moving sports object with a simultaneous Doppler measurement of a radial distance, speed or other measurement of the moving sports object. The method may further comprise using a camera measurement to replace, augment, correct, or improve a measured angular position or horizontal or vertical position of the moving sports object.

In an example embodiment, a method of tracking a moving sports object includes arranging two sensors to track the moving sports object simultaneously, and combining simultaneous measurements of one or more of a spatial position, a translational velocity, a rotational velocity, a translational acceleration, and/or a rotational acceleration of the moving sports object made by the two sensors simultaneously, wherein one sensor is a Doppler radar and the other sensor is a camera. The method may further comprise interpolating a three dimensional trajectory of a camera measurement of the moving sports object's motion using radar data, based at least in part on a failure of one of the two sensors to provide measurements during a period that the moving sports object is being tracked.

In an example embodiment, a method of tracking a moving sports object includes combining simultaneous measurements of the sports object made by a Doppler radar and a camera, and using the Doppler radar measurement to predict or identify an actual or expected position of a tracked moving sports object in the camera image.

An example method includes combining simultaneous measurements of a sports object made by a Doppler radar and a camera by using the Doppler radar measurement to identify the correct object in the camera image. Another method includes combining simultaneous measurements of a sports object made by a Doppler radar and a camera by using camera measurement of the object at a stationary position being an initial position or a final position to identify actual position of the object to the radar at that time. Another example method includes combining simultaneous measurements of a sports object made by a Doppler radar and a single camera to provide spatial positions, and/or translational and/or rotational velocities in three-dimensional space. Another example method includes using a Doppler signal simulator to calibrate the rotational position of a Doppler radar to a world coordinate system. Still further, an example method can include using a Doppler signal simulator as a common calibration object to a Doppler radar's rotational position and a camera's rotational position to a world coordinate system.

A method is also provided for combining radar measurements of an object's position with a camera's measurements in coordinates mapped to an image sensor for the purpose of constructing a two dimensional trace of the object's motion. Further to above, a method can include interpolating a two dimensional trace of camera measurements of an object's motion using radar data. Still further, a method is provided to extrapolate a two dimensional trace of camera measurements of an object's motion using radar data.

In one example embodiment, a system for tracking a moving sports object comprises processors and a memory storing instructions that, when executed by at least one processor among the processors, cause the system to perform operations comprising calibrating a perspective of an image of a camera to a perspective of a Doppler radar for simultaneous tracking of the moving sports object, and tracking the moving sports object simultaneously with the camera and Doppler radar.

In another example embodiment, a computer-readable medium (CRM) comprises instructions that, when read by a computer, cause the computer to perform operations comprising, at least calibrating a perspective of an image of a camera to a perspective of a Doppler radar for simultaneous tracking of the moving sports object, and tracking the moving sports object simultaneously with the camera and Doppler radar. The system and CRM operations may include the further operations summarized above.

In another example embodiment, a method is disclosed for using radar measurements or any other technique to improve the depth measurement accuracy of camera tracking of a moving sports object by using radar in combination with the camera tracking, or using radar measurements to assist camera tracking including aiding detection and tracking of a moving sports object when camera (or other) image processing fails to detect or track the moving sports object.

Another method is disclosed for improving radar measurements of a moving sports object using camera measured data. Other variations of combining radar and camera measurement of a moving sports object are possible.

BRIEF DESCRIPTION OF THE DRAWINGS

In order more easily to identify the discussion of any particular element or act, the most significant digit or digits in a reference number refer to the figure number in which that element is first introduced.

DETAILED DESCRIPTION

Figure 1:
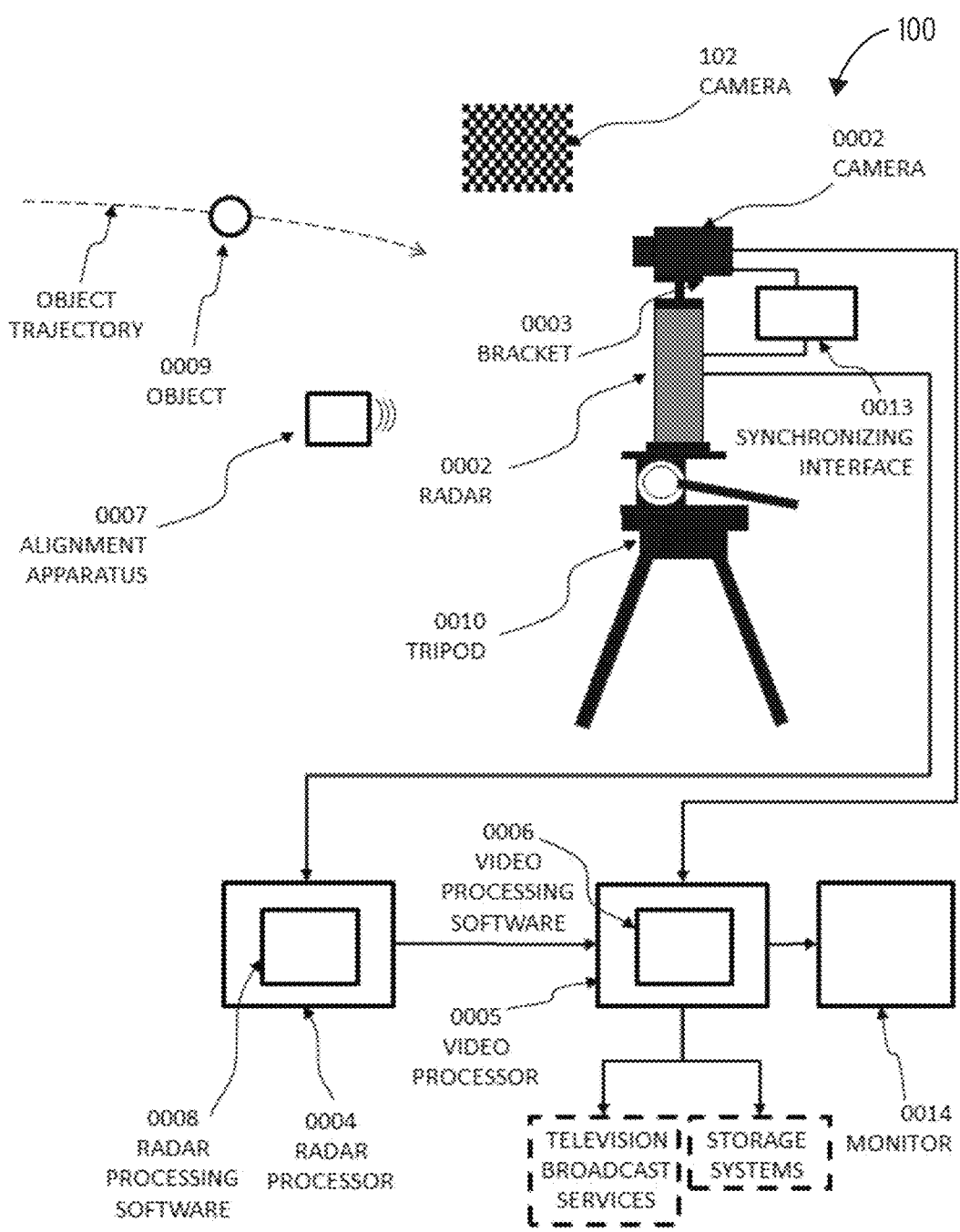
FIG. 1 is a schematic view of an embodiment of the present subject matter, in accordance with an example embodiment.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, EDH US LLC, All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Referring now to FIG. 1, elements of a tracking system 100 are shown. A tracking Doppler radar 0001 and a camera 0002 are set up to view or measure a desired sports object 0009. The intrinsic parameters of the camera 0002 must be calibrated before use, using a patterned surface such as a checkerboard 102 or similar. An alignment apparatus 0007 is used to calibrate the orientation of the radar 0001 before use. Calibration objects 0012 and 0013 (FIG. 3) are used to calibrate the camera 0002 orientations before use. An output of the radar 0001 is connected to a radar processor 0004. The radar processor 0004 runs radar processing software 0008 to calculate the output of the radar processor 0004. The radar processor 0004 is connected to the video processor 0005. The output of the camera 0002 is connected to the video processor 0005. The video processor 0005 runs video processing software 0006 to calculate the output of the video processor 0005, also using the output from the radar processor 0004. A monitor 0014 is connected to the video processor 0005 for use during camera calibration and system operation to display information and images to an operator. Another output of the video processor 0005 is connected to an external system which can be a television broadcasting system.

Figure 2:
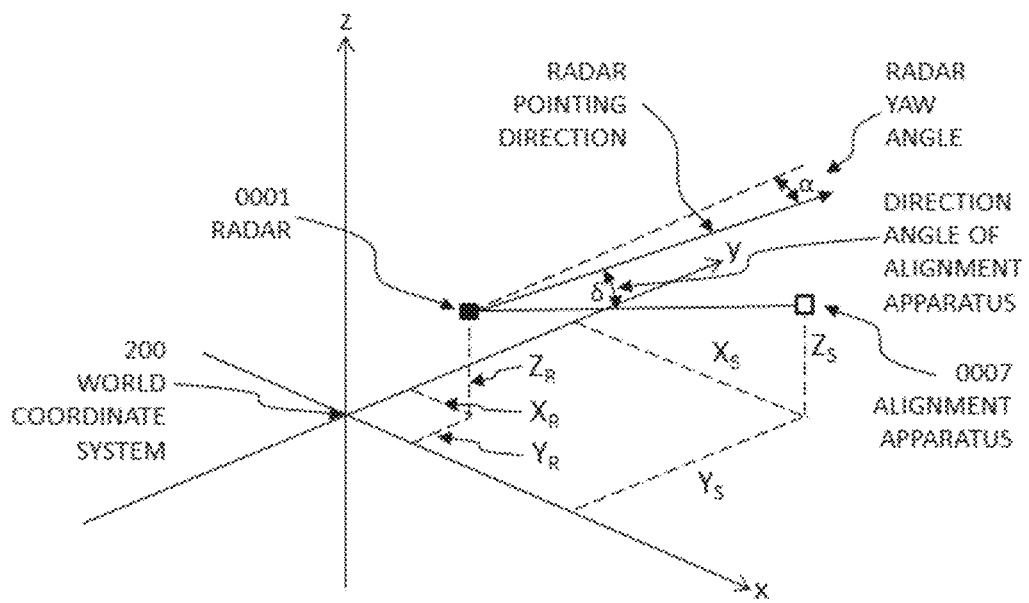
FIG. 2 is a schematic view of an alignment of a radar component within a world coordinate system using an alignment apparatus, in accordance with an example embodiment.
Figure 3:
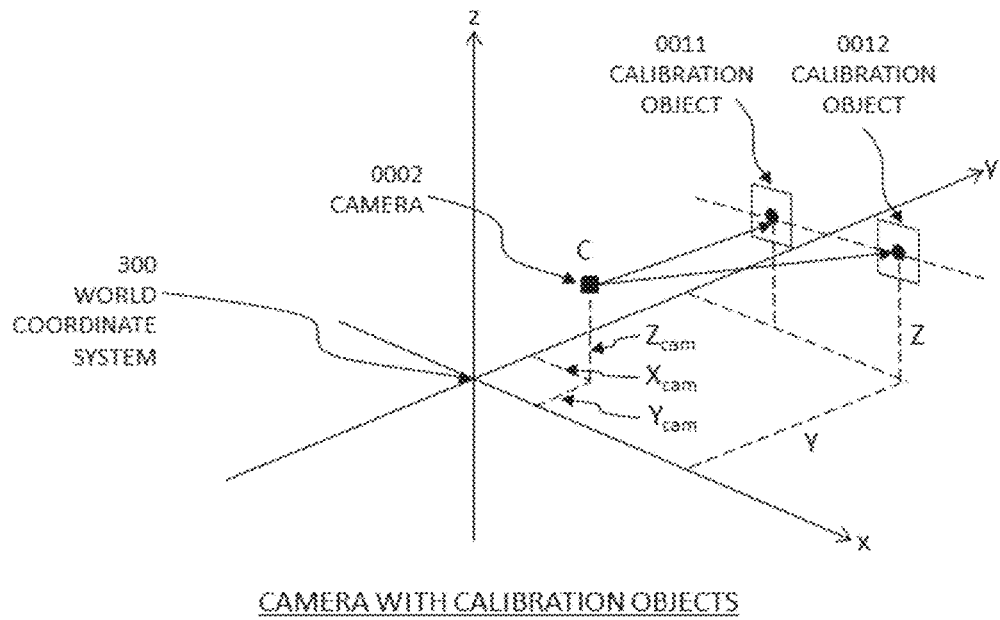
FIG. 3 is a schematic view of an alignment of a camera within a world coordinate system using calibration objects, in accordance with an example embodiment.
Figure 4:
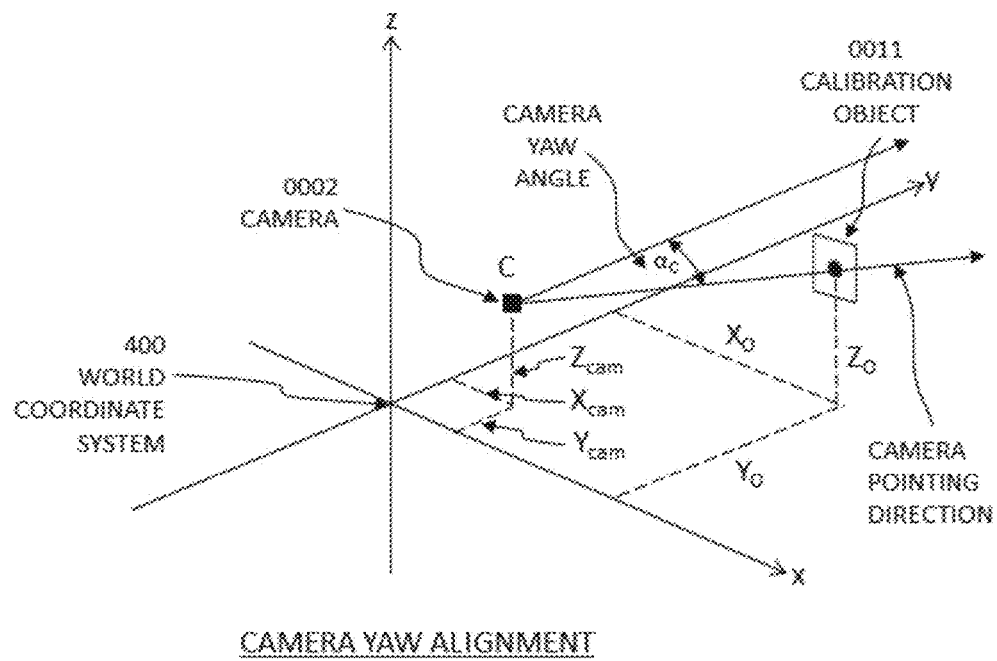
FIG. 4 is a schematic view of an alignment of a camera yaw angle within a world coordinate system using a calibration object, in accordance with an example embodiment.

Aspects of the present subject matter can be achieved by combining a 3-D tracking Doppler radar and a camera to track a sports object. For purposes of explanation, certain reference coordinates and angles are now defined. FIG. 2 is a schematic view of the alignment of the radar 0001 within a world coordinate system using an alignment apparatus 0007. Certain coordinates and angles in a world coordinate system 200 including the radar 0001 and the alignment apparatus 0007 are as shown. In FIG. 3, further coordinates within a world coordinate system 300 including the camera 0002 and two calibration objects 0011 and 0012 are as shown. In FIG. 4, further coordinates and angles within a world coordinate system 400 including the camera 0002 and calibration objects 0011 and 0012 are as shown.

An appropriate arrangement of the radar 0001 and camera 0002 can be established in several ways. One way is to mount them in fixed positions allowing no movement of either during use. Alternately they can be combined in an assembly where the radar 0001 and camera 0002 are fixed relative to each other, but the assembly as a whole can be moved relative to a world coordinate system. FIG. 1 shows such an arrangement where the camera and radar are mechanically locked together using a bracket 0003 atop a tripod 0010 in this case, the methods described here to combine radar and camera measurements remain valid, but the positions and orientations of the assembly in world coordinates to be measured to allow measurements to be transformed to world coordinates if it is required. If the movements are purely rotational, commercial digital shaft encoders such as US Digital's MA3 Miniature Absolute Magnetic Shaft Encoders can be used on the rotational axes of the moving structure that can for example be a tripod head. If the movement is both linear and rotational, an inertial navigation platform such as Novatel's IMU-CPT with three-axis accelerometers and three-axis fiber optic gyroscopes can be used to track the movement of the assembly relative to a starting position and orientation in world coordinates.

The radar processor 0004 is provided with radar processing software 0008 that calculates the speed, position and other data of the object 0009. Radar measurements that are typically made are in spherical coordinates, being range (distance), elevation angle and azimuth angle and can be readily transformed to linear (Euclidian) coordinates in the radar coordinate system, and also to the world coordinate system.

The video processor 0005 is provided with video processing software 0006 that controls camera settings, performs camera calibration procedures, tracks the object in the camera images, combines camera and radar measured data in the way contemplated by the present subject matter invention, and transforms the tracking data to world coordinates.

The camera 0002 can be a digital CMOS area scan camera with externally controllable global shutter, such as a Dalsa Genie Nano model M1920, with 12-bit pixel resolution. Alternately the camera can be a high definition broadcast camera such as a Sony model HDC-1500R with a generator locking (genlock) input. The camera is equipped with a suitable lens chosen with zoom and focus adjusted to cover the origin and trajectory of the ball from a position behind the ball launch position.

The radar 0001 can be a Doppler radar located in a position near the ball launch position and directed in a way that its antenna radiation patterns cover the origin and trajectory of the ball, with the position chosen so that the ball flight direction is approximately towards or away from the radar. The radar can transmit a continuous wave fixed frequency low power signal of approximately 10 milliwatts in the band between 10.500 to 10.550 GHz, receive the signal reflected from the approaching or receding object 0009, mix the received signal with a copy of the transmitted signal, low pass filter the output from the mixer to provide a time varying signal, the Doppler signal, whose frequency equals the Doppler shift caused by the movement of the object 0009 relative to the radar 0001. The radar 0001 operates with a radar processor 0004 with radar processing software 0008 that analyzes the momentary frequency of the Doppler signal and calculates the radial speed of the ball through the Doppler shift formula:

$$v = f/(2 \cdot f0/c), \text{ where}$$

v=the momentary radial speed of the object in m/s
f=the momentary frequency of the Doppler signal in Hz
f0=the frequency of the radar transmitter in Hz
c=the phase velocity of electromagnetic waves in air in m/s The radar 0001 also measures the elevation angle and azimuth angle of the Object 0009 relative to the boresight direction of the radar by comparing the phase of the signals received in at least one pair of antennas separated vertically to measure elevation angle and one pair of antennas separated horizontally to measure azimuth angle, using the formula below in both cases:

$$\text{Direction angle} = \phi \cdot c/(2 \cdot \pi \cdot s \cdot f0), \text{ where}$$

$\phi$=the phase difference between the signals received at the two separated antennas, in radians
c=the phase velocity of electromagnetic waves in air in m/s
f0=the frequency of the radar transmitter in Hz The radial distance of the object 0009 can be found by integrating the Doppler speed as a function of time, and using the object's 0009 known or assumed starting position. Alternatively the radar 0001 can be configured to measure the radial distance of the object 0009 directly, for example by using a dual-frequency radar and using phase comparison of the transmitted and received signals to provide an estimate of the target range in the radar processing software 0008.

A camera to radar calibration is now described. A position and orientation of the radar 0001 relative to the camera's 0002 position and orientation must be calibrated at least once. This can be done in a variety of ways. One way is to calibrate both the radar coordinate system and the camera coordinate system to a common world coordinate system, thereby establishing a relationship between radar and camera coordinate systems.

One way to calibrate the radar coordinate system to a world coordinate system is described below; this method does not preclude other ways to achieve the same result.

A world coordinate system can be chosen where the x-axis and the y-axis are in the horizontal plane, and the z-axis is vertical. The linear position of the radar 0001 relative to the origin of the world coordinate system, $[X_R\ Y_R\ Z_R]$ can be measured using a common tape measure. The radar's 0001 rotational positions roll ($\gamma$), pitch ($\beta$), and yaw ($\alpha$) must also be determined. An electronic gravity referenced sensor such as a model CXTLA02 2 axis tilt sensor manufactured by MEMSIC can be used to determine the roll and pitch angles of the radar relative to the vertical. The yaw (a) angle of the radar 0001 can be determined by placing a the alignment apparatus 0007 which is a Doppler signal simulator at a known position $[X_S\ Y_S\ Z_S]$ in the world coordinate system, and using the radar 0001 to measure and report the direction of the sensed signal in the radar coordinate system. The radar's yaw angle can be calculated from the position of the radar $[X_R\ Y_R\ Z_R]$, the Doppler signal simulator $[X_S\ Y_S\ Z_S]$, and the direction angles measured by the radar 0001. The calculation can be simplified if the body of the radar 0001 is set up so that its X-Y plane is horizontal, or otherwise stated, the pitch and roll angles are set to zero degrees. With particular reference to FIG. 4, the yaw can then be calculated by the equation:

$$\alpha = 90° - \delta - \tan^{-1}[(Y_S - Y_R)/(X_S - X_R)]$$

where
$\alpha$=yaw angle, degrees, and
$\delta$=horizontal direction angle of Doppler simulator as measured by radar, degrees One way to calibrate the camera 0002 coordinate system to the world coordinate system is described below; this method does not preclude other ways to achieve the same result.

A simplified method involves choosing the world coordinate system with x-axis and y-axis both in the horizontal plane, with a vertical z-axis. The linear position of the camera 0002 relative in the world coordinate system, $[X_{cam}\ Y_{cam}\ Z_{cam}]$ can be measured using a tape measure.

The camera's 0002 rotational positions roll ($\gamma$), pitch ($\beta$), and yaw ($\alpha$) must also be determined. The process can be simplified by setting the camera 0002 up so that the roll and pitch values are zero, this can be done by setting up two calibration objects 0011 and 0012 that could comprise 1 inch diameter black dots printed on white backing sheets at a similar distance that could be 20 feet from the camera 0002 and in the camera field of view, at the same vertical height as the camera height. While monitoring the camera image on the monitor 0013 the camera's roll angle can be adjusted to zero which is when the two calibration objects are at the same vertical pixel position in the camera image. The camera's pitch angle can be adjusted to zero which is when the calibration objects are at the vertical center of the camera image.

The camera Yaw ($\alpha$) angle can be determined by placing a calibration object 0011 at a position in the world coordinate system $[X_O\ Y_O\ Z_O]$ chosen to be at a desired camera yaw angle $\alpha_C$. The appropriate position for the calibration object is determined as follows (see FIG. 4):

Let the calibration object height be the same as the camera height: $Z_O = Z_{CAM}$ Choose a position along the Y axis for the calibration object so that it is some practical distance forward of the camera for example approximately twenty feet. Determine the precise y axis separation distance between the camera and the calibration object $Y_O - Y_{CAM}$ by measurement using a tape measure. Calculate the position along the X axis for the calibration object 0011 as:

$$X_O = X_{CAM} + (Y_O - Y_{CAM}) \cdot \tan(\alpha_C)$$

Place the calibration object 0011 at the position $[X_O\ Y_O\ Z_O]$. While monitoring the camera image on the monitor 0014, rotate the camera 0002 around its yaw axis until the calibration object 0011 is displayed at the horizontal center of the camera image.

Another method of calibration includes an intrinsic camera calibration. Here, a digital camera is used. A so-called camera model maps a world coordinate system to an image coordinate system. The camera model comprises a number of parameters which are often decomposed into the so-called extrinsic and intrinsic parameters. Generally, the parameters relate to rotation and translation, perspective, image plane to pixel translation, and optics distortion values. Points in the world coordinate system are denoted by $[X\ Y\ Z]^T$ and points in image coordinates by $[u\ v]^T$.

The world coordinate system has an arbitrary origin and axis system chosen by a user. The camera 0002 has a coordinate system in which the camera axis is aligned in the z direction and is located at the camera 0002 position. It is assumed that the object 0009 is in the field of view of the camera 0002. Also, the camera's linear position in the world coordinate system, denoted as the vector C, is known by measurement using a tape measure.

The intrinsic parameters of a camera 0002 which includes its lens can be predetermined by calibration and remains fixed unless the camera or lens is changed. The extrinsic parameters are determined with the camera 0002 in its intended operating position relative the world coordinate system in which the object 0009 will be tracked.

The camera parameters and related data typically consist of:

Camera position $P_{cam} = [X_{cam}, Y_{cam}, Z_{cam}]^T$, where $X_{cam}$, $Y_{cam}$, $Z_{cam}$ are the camera position coordinates in the world coordinate system.

A rotation matrix R which rotates 3D points to the camera coordinate system. A principal point c is described by its offsets $c_x$ and $c_y$ from the geometrical center of the imaging sensor. The camera's focal length is denoted as f. If non square pixels are modeled, the focal length can be broken down into two separate parameters $f_x$ and $f_y$. This elaboration is unnecessary for this description. A set of distortion coefficients is determined to correct for nonlinear image distortion. An example of such a mapping may be:

$$x'' = (1 + k_1 \cdot r^2 + k_2 \cdot r^4) \cdot x'$$

$$y'' = (1 + k_1 \cdot r^2 + k_2 \cdot r^4) \cdot y'$$

where
x" and y" are the appropriately distorted parameters,
x' and y' are undistorted parameters, and $$r = ((x')^2 + (y')^2)^{1/2}$$

The parameters and factors above are similar to the perspective camera model used by the OpenCV open source software libraries.

Figure 6:
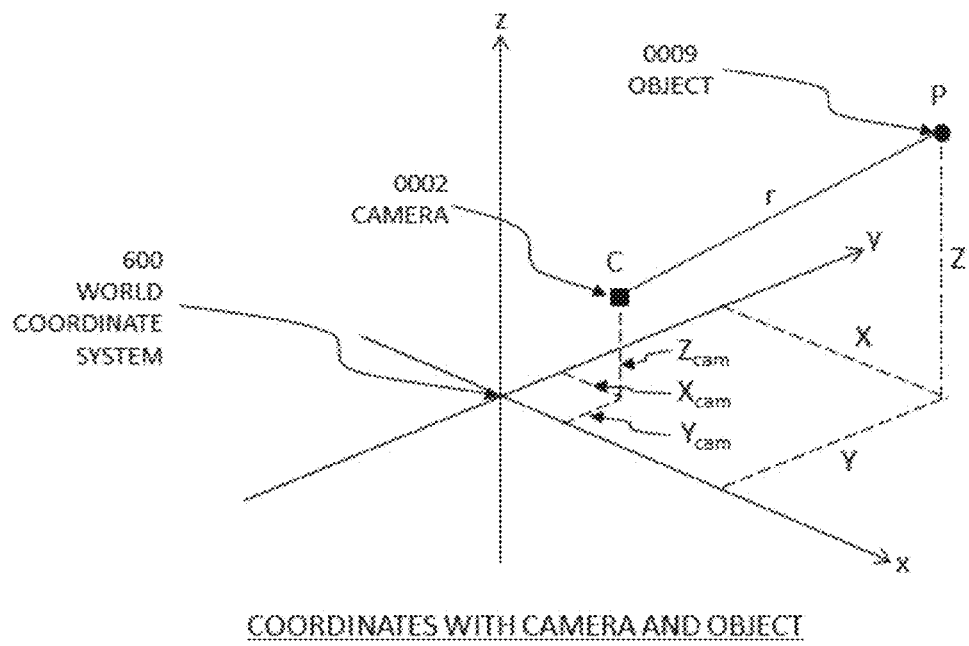
FIG. 6 is a schematic view of a relationship of the camera position with an object position within a world coordinate system, in accordance with an example embodiment.

In FIG. 6 of the accompanying drawings, coordinates within a world coordinate system 600 for the camera 0002 and an object 0009 are as shown. A complete mapping from world to image coordinates using a system described herein can thus be expressed as follows:

$$P_{cam} = [X_{cam}\ Y_{cam}\ Z_{cam}]^T = R \cdot (P - C)$$

$$x' = X_{cam}/Z_{cam}$$

$$y' = Y_{cam}/Z_{cam}$$

$$x'' = (1 + k_1 \cdot r^2 + k_2 \cdot r^4) * x'$$

$$y'' = (1 + k_1 \cdot r^2 + k_2 \cdot r^4) * y'$$

$$r = ((x')^2 + (y')^2)^{1/2}$$

$$u = f x'' + c_x$$

$$v = f y'' + c_y$$

where
X=object X position in world coordinates
Y=object Y position in world coordinates
Z=object Z position in world coordinates
$P = [X\ Y\ Z]^T$=object's position vector in world coordinates
$X_{cam}$=object X position in camera coordinates
$Y_{cam}$=object Y position in camera coordinates
$Z_{cam}$=object Z position in camera coordinates
$P_{cam}$=vector of object position in camera coordinates
$c_x$=horizontal coordinate of the camera principal point
$c_y$=vertical coordinate of the camera principal point
R=Rotation Matrix, that rotates points to the camera coordinate system
C=Camera position vector in world coordinates
$k_1$ and $k_2$=distortion coefficients
r=distance from the principal point
u=horizontal image coordinate
v=vertical image coordinate
f=focal length The camera parameters can be calibrated by using software that implements functions available in the OpenCV open source software library. The OpenCV library documentation provides additional descriptions of the camera model, camera calibration, and the OpenCV functions available to do it. Alternatively, the Matlab Camera Calibration Toolbox can be used to achieve camera calibration.

The practical calibration procedure, using either OpenCV or Matlab Camera Calibration Toolbox software functions, requires the use of a black-white checkerboard, or checkered surface, as a calibrating object. In one example, the procedure involves taking a number of still pictures of a checkerboard 102 in a number of different positions and orientations. The checkerboard pattern theoretically requires at least two but practically for example ten or more images taken with the object at widely varying aspects. Each aspect results in an equation and these are eventually solved to provide the camera intrinsic parameters.

The camera 0002 is set up to capture images at a fixed frame rate that can be approximately 30 frames per second. The video processing software 0006 is programmed to allow control of the camera settings regarding the source of the frame clock or shutter control, to use either an internal or external signal or control input.

Measurements of the object 0009 obtained from the camera 0002 and the radar 0001 respectively must be synchronized in time to allow their combination. Synchronization can be done by supplying a synchronization signal at a suitable rate which can be approximately 30 frames per second to both the camera 0002 and the radar 0001. This signal can controls the shutter or the frame rate of the camera 0002 and is also used by the radar 0001 to lock or reference its internal sampling and processing to the externally supplied clock. In this way radar measurements and camera measurements can be related in time. A synchronizing interface 0013 can be used to provide the required synchronization for the radar 0001 and the camera 0002.

Measurements of the object 0009 obtained from the camera 0002 and the radar 0001 respectively must be synchronized in time to allow their combination. Synchronization can be done by supplying a synchronization signal at a suitable rate which can be approximately 30 frames per second to both the camera 0002 and the radar 0001. This signal can controls the shutter or the frame rate of the camera 0002 and is also used by the radar 0001 to lock or reference its internal sampling and processing to the externally supplied clock. In this way radar measurements and camera measurements can be related in time. A synchronizing interface 0013 can be used to provide the required synchronization for the radar 0001 and the camera 0002.

The video processor 0004 receives successive images from the camera at the known or controlled frame rate. The video processing software 0005 stores number of successive received images in a circular memory buffer 0101. Next, the images are processed to detect the presence of one or more moving objects in the image. Object motion results in changes in successive images. One common method that can be used to identify such objects is to calculate difference images to highlight the moving object (e.g. a ball) against a stationary background over an elapsed time. The following steps describe one way to perform image processing but do not preclude other implementations that achieve a similar result.

At every time step of the frame rate, use the three most recent images $I_n$, $I_{n-1}$ and $I_{n-2}$. $I_q$ is an image at time index q, n is the index of the most recent image, n−1 the index of the previous image, and n−2 the index of the image before that. Use the images to calculate the difference images as follows:

$D_{-1} = I_n - I_{n-1}$ being the difference between the current and the previous images, and $D_{-2} = I_{n-1} - I_{n-2}$ being the difference between the previous image and the image before that, and $DD = D_{-1} - D_{-2}$ being the difference between the two difference images.

A following step is to perform thresholding on the image DD, to produce a new image T. If the camera is for example a monochrome camera with 12 bit pixel resolution, the minimum pixel value of 0 corresponds to "black" and the maximum pixel value of 4095 (being $2^{12}-1$) corresponds to "white". The thresholding step compares the absolute value of each pixel in image DD to a threshold value that can for example be 35% of the range between black and white. The process can construct a new image T whose pixel values are set to "0" (black) for pixels whose absolute value do not exceed the threshold, and equal to the absolute value if it meets or exceeds the threshold.

Figure 7:
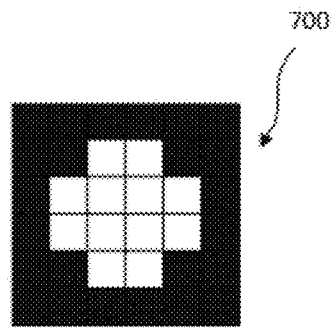
FIG. 7 is a graph of an example of an input kernel for an image processing erosion function, in accordance with an example embodiment.

Next, the threshold image T may be further processed by a method called erosion, which is a form of morphological image processing. This uses a pixel structure that approximates the size and shape of the tracked object in the image. The erode function in the OpenCV software library can be used to perform this operation. If the tracked object is a ball, an input kernel that models the size and shape of a ball can be used. An input kernel 700 of 12 pixels in the form depicted in FIG. 7 can for example be used.

This process step erodes unwanted noise and details that result from the previous image-processing steps, and retains the part of the image that corresponds to the size and shape of the tracked object.

Next the position of the Object 0009 in the image can be determined. One way to determine this is to calculate the smallest circle enclosing the tracked object image. This can be done by using the OpenCV software function minEnclosingCircle( ). The coordinates of the circle origin can be used as an estimate of the tracked object's position. Alternative methods can be used to find the object's position, for example using methods of moments that calculate the center of mass of a found object. This is useful for shapes that are not circle-shaped, for example the blur of a fast-moving ball.

It is also possible to adapt, or use other image processing methods as described above for objects that to handle practical implementation variations.

When tracking the object 0009 by camera 0002, standard theoretical procedures may fail in practical situations. One such situation is if there are other moving objects in the image for example a tennis ball to be tracked with moving players and rackets also in view. Another situation is if the background contains items that move such as leaves blown by wind, moving clouds, or shadows. Another situation is where multiple targets are present, for example a golf ball to be tracked on a busy golf driving range where many other balls are in flight at any instant. These situations can affect the reliability and accuracy of image processing steps that use differencing and thresholding.

In order to minimize the presence of unwanted objects in the processed image, the image processing can be constructed to favor an object based on a predicted future position derived from previously known positions and other dynamical parameters of the object 0009. This increases the probability of detecting the object in the image and reduces false detections.

The prediction can be for example use either simple or advanced dynamical models of object motion. The prediction can use previous data of the object from camera tracking. The prediction can also use radar-measured object data. Radar data can also be used in combination with camera tracking data. The video processor 0005 for example can receive the position of the object from the radar processor 0004 and calculate its position in image coordinates. Predicted object positions can be estimated by means of a simple model that for example assumes that the direction of the moving object remains unchanged over the processing time interval while the displacement from the previous position in image coordinates follows a law of constant lateral acceleration or deceleration. The predicted position may also be an output from a sophisticated tracking system based on physical laws of motion for the object and using for example Kalman filtering to estimate the object's positions, speeds, and directions.

An object in the camera image that best corresponds to the predicted position of the object 0009 can be favored against other objects that are present in the image. For example an object can be chosen as the one closest to the predicted object 0009 position. The object 0009 can also be found by constructing an area of interest based on its predicted future position and found objects can be filtered by excluding those that do not fall inside the area of interest. The size and shape of the area of interest can allow for variations and uncertainties in the prediction method.

If an area of interest is predicted, the image processing load of the video processor 0004 can be reduced by only performing image processing steps in and near the area of interest. This may be a benefit if the video processor is an embedded processing system with limited processing resources.

The found position of the object 0009 in camera image coordinates [u v] can be used to calculate its angular positions in world coordinates. Using known camera parameters and the object's distance which is received from the radar processor 0004 or estimated in another manner, the image coordinates of the object 0009 can be processed as follows:

The point position of the object 0009 in image coordinates can be mapped to world coordinates given a distance from the camera by performing the following calculations:

$$x'' = (u - c_x)/f$$

$$y'' = (v - c_y)/f,$$

where
$c_x$ = horizontal coordinate of the camera principal point
$c_y$ = vertical coordinate of the camera principal point
u = the horizontal position of the object in image coordinates
v = the vertical position of the object in image coordinates
f = focal length
Next, calculate the vector $[x'\ y']^T$ as the solution to $$x' = x''/(1 + k_1 \cdot r^2 + k_2 \cdot r^4)$$

$$y' = y''/(1 + k_1 \cdot r^2 + k_2 \cdot r^4)$$

where $k_1$ and $k_2$ = the distortion coefficients found from the camera calibration r = the distance of the object, provided from radar measurement The position of the object 0009 in the coordinate system of the camera 0002 $P_{cam}$ can now be constructed as $[x'\ y'\ 1]^T$ and then scaled to have length r.

Next, the position of the Object 0009 in world coordinates P can be calculated as $P=R^{-1}\cdot P_{cam}+C$ where R = the camera rotation matrix $P_{cam}$ = the position of the object in camera coordinates C = the camera position vector in world coordinates r = the radial distance of the object In a final step the elevation and azimuth angles of the object 0009 in world coordinates can be calculated by simple trigonometry from the object position vector P.

The processing cycle is repeated every time a new image frame is received from the camera 0002. In doing so the time-wise positions of the object 0009 in the world coordinate system is determined.

The video processing software 0006 can be made to compare positions of the object 0009 in image coordinates with positions of the object 0009 tracked by the radar 0001 and transformed to image coordinates. Unless the camera and radar measurements are exactly synchronous, that is, taken at the same time instants, either the camera measurements or the radar measurements must be interpolated to provide data values that correspond to the sampling times of the other.

Sets of positional data of the object 0009 measured by the camera 0002 and the radar 0001 respectively can be compared to show and measure differences between the sets. Differences include rotational and translational offsets as well as measurement errors. Offsets may be due to residual errors in the relative alignment between the camera 0002 and radar 0001, as well as offsets in the calibration of the radar's electronic response to its mechanical body, and other systematic errors.

Figure 8:
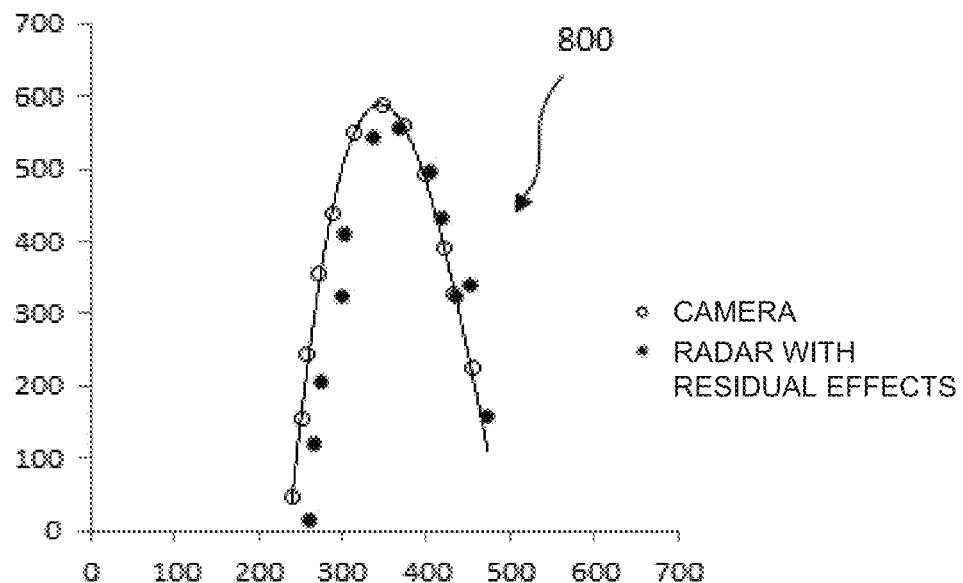
FIG. 8 includes graphs illustrating example offsets between radar and camera data in camera image coordinates and their minimization, in accordance with example embodiments.
Figure 8:
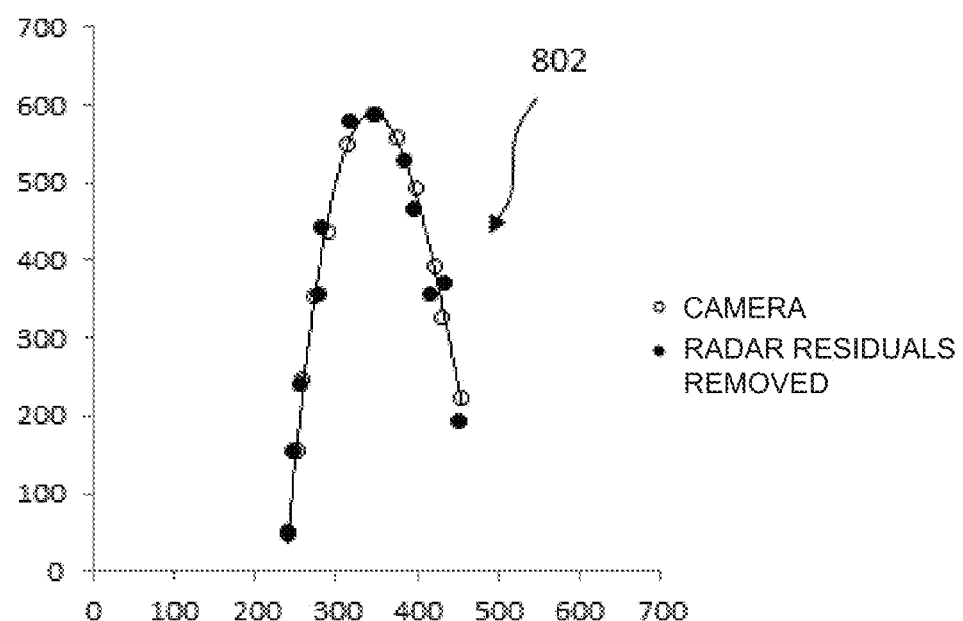

A procedure can be performed to minimize the offsets between the camera and radar position data, for example by projecting the radar measurements to image coordinates, and changing them to minimize the average error relative to the camera measurements. Any optimization procedure that minimizes an error function can be applied. This procedure helps to ensure that radar data can be visually displayed on camera images with minimum offsets and compensates for calibration errors during use. Graphs 800 and 802 in FIG. 8 illustrate typical radar and camera offsets before and after error minimization, respectively.

Figure 5:
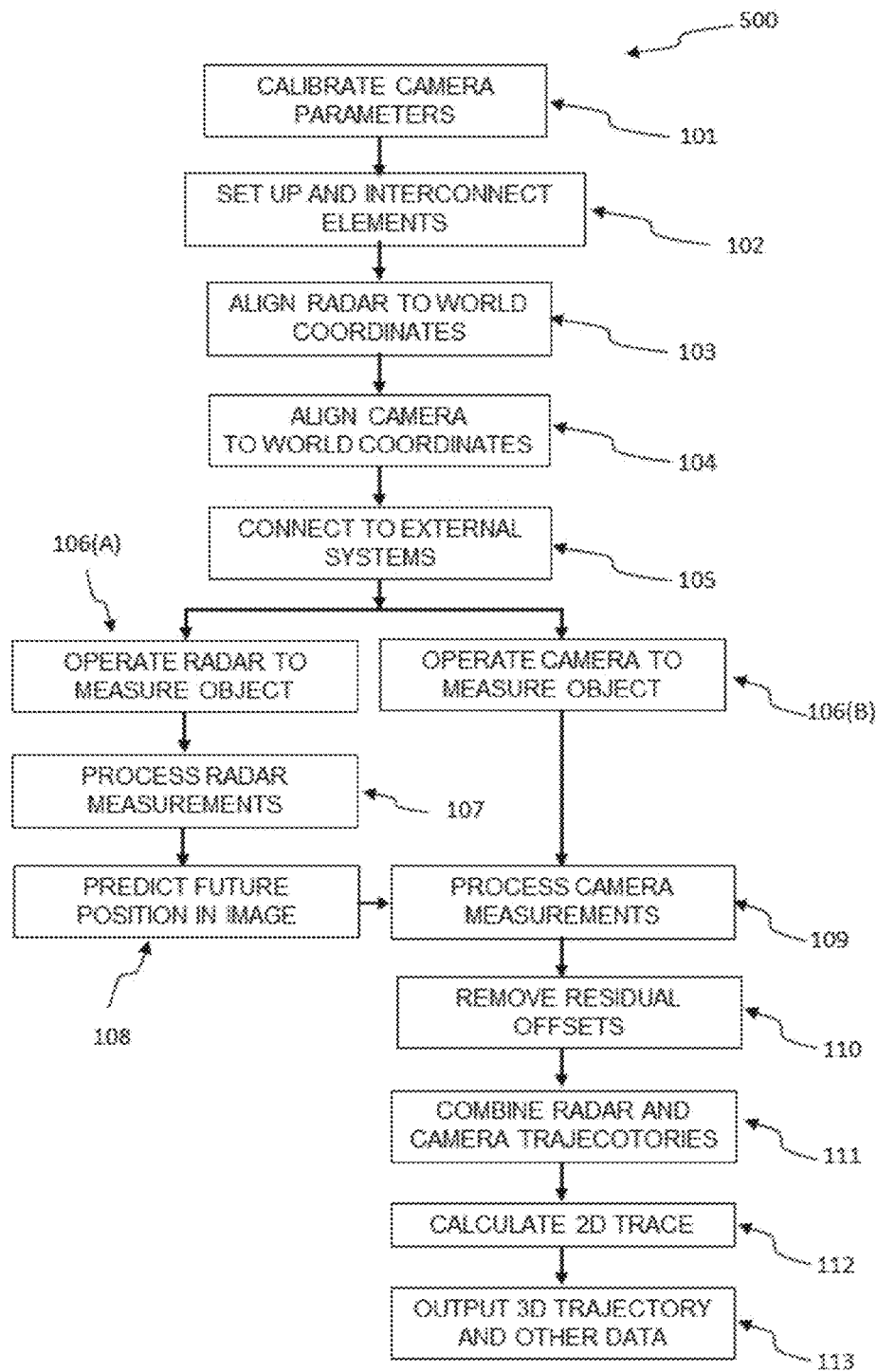
FIG. 5 is a flow chart of an example method of the present subject matter, in accordance with an example embodiment.

Embodiments of the present subject matter may include methods. With reference to FIG. 5, example operations in a method 500 of tracking a moving sports object are shown. Step 101 includes calibrating the parameters of the camera 0002 before use. Step 102 includes setting up the radar 0001 and the camera 0002 in positions and orientations that are suitable to allow both to measure the object 0009 during its movement. In this step the linear positions of the radar 0001 and the camera 0002 are determined relative to a chosen world coordinate system. The method 500 may include connecting the camera 0002 to the video processor 0005 and the monitor 0014, so that the camera can be operated. The method 500 may include connecting the radar 0001 to the radar processor 0004 so that the radar can be operated. Step 103 is a procedure performed before the system is operated, to align the radar 0001 to a world coordinate system using an alignment apparatus 0007. Initially the pitch and roll of the radar is calibrated, after which the alignment apparatus 0007 is used to calibrate the yaw of the radar. Step 104 is a procedure to align the camera 0002 by calibrating its pitch, roll and yaw to the world coordinate system using calibration objects 0001 and 0012. Step 105 connects the output of the video processor 0005 to external systems, if desired, so that the outputs of the video processor can be used. Steps 106(*a*) and 106(*b*) are to commence operating the radar and the camera to measure the movement of the object 0009 during the sports event. Step 107 is to process measurements from the radar 0001 by the radar processor 0004 to calculate the object's trajectory, speeds spin rates, as well as its positions in either radar or world coordinate systems, or both. The output from the radar processor 0004 is fed to the video processor 0005. Step 108 is for the video processor 0005 to calculate a predicted future position of the object in image coordinates using radar measurements, or using a combination or radar measurements and camera measurements. Step 109 is to process measurements from the camera 0003 by the video processor 0004 to calculate the object's positions and related data in camera and image coordinates. Step 110 transforms radar data to image coordinates, compares camera and radar data and removes residual offsets. The video processor transforms the output from the radar processor to image coordinates. The video processor interpolates radar measurements to a time base corresponding to that of the camera measurements, or vice versa. Step 111 combines camera and radar data to generate object trajectory and other data. The video processor calculates object position estimates of the object in world coordinates, using combination of radar measurements and camera measurements. Step 112 is the video processor generating graphical data representing a trace in 2-D of the object's trajectory and which may include other measured object data such as speed. In step 113 the video processor 0005 outputs object trajectory and other data, as well as an unmodified clean video feed, as well as graphical data in the form of a trace of the trajectory in combination with the video feed to the connected external systems.

Camera and radar measurements may be combined in a number of ways to improve the accuracy and reliability in the object tracking. By way of illustration and not as a complete list, camera tracking suffers or is limited by the following shortcomings:

1. Measures an object's position in 2 dimensions only. Although stereoscopic methods can be used for 3-D measurement, depth accuracy is sensitive to the separation distance and rotational accuracies of stereo cameras. Stereoscopic arrangements also require additional costly camera hardware 2. The distance to which objects can be tracked is restricted by camera resolution. A certain minimum number of picture elements are required to resolve an object. A camera set up with a field of view tailored to a particular sporting event will invariably have a limit in its distance tracking ability.

3. Objects can be obscured causing the camera to temporarily or permanently lose track of the object.

4. Objects that move primarily away or towards the camera will not be detected and tracked reliably by the usual methods of differencing to distinguish moving objects.

5. Poor contrast of the object against the background for example a white golf ball against white clouds or bright sky impairs detection and tracking and degrades measurement accuracy.

6. Poor illumination of the object impairs detection and tracking and degrades measurement accuracy.

7. Poor illumination of an object may be overcome by using longer exposure times. This can however result in motion blur which impairs detection and tracking and degrades measurement accuracy.

8. Non-uniform illumination of an object, for example a ball that appears with a high contrast crescent can impair its detection and tracking and degrades measurement accuracy.

9. Other moving objects can mask the desired object by creating noise or false targets in the image, affecting detection, tracking, and measurement.

10. In sports events, objects and backgrounds can be masked or interfered with by shadows from players or structures. Even if these are not moving rapidly, changes in the background brightness will affect the detection, tracking and measurement of a desired object if no adjustments are made to the camera settings to overcome this.

Doppler radar measurement has by example the following shortcomings:

1. Position measurements become increasingly noisy as the distance between the radar and the tracked object increases.

2. Measured elevation and azimuth angles to the object can be distorted by multipath effects.

3. Moving machinery such as rotating fans, irrigation sprinkler systems, and others can interfere with radar's ability to detect, track and measure an object.

4. Radar signals can be blocked by people or items between the radar and the tracked object, sometimes if the tracked object moves into a position behind a structure.

5. Multiple targets for example on a golf driving range may cause the radar to lose a tracked object.

Camera tracking however has the following strong characteristics:

1. Can accurately determine an object's position in two-dimensions

Doppler radar has the following strong characteristics:

1. Generally it can track a sports ball to a greater distance than is possible with a camera 2. Measures radial speed accurately 3. Not dependent on the visual illumination of the object The accurate 2-dimensional camera position measurements can be combined with the accurate distance (or depth) measurement as well as the enhanced distance tracking of the radar, providing greater tracking precision and reliability that the current state of the art. If the camera loses track of the object for a period of time, radar tracking data can be inserted. Object tracking can be extrapolated with the radar data only when the camera permanently loses a track.

Radar and camera tracking data can be combined in an optimal manner based on the quality of or variances in the measurements from the camera and radar respectively. This can for example be implemented by a tracking filter such as a Kalman filter or similar. A tracking filter estimates a current state vector comprising the three dimensional positions, speeds and accelerations of a tracked object using a prediction from a dynamic model based on physical laws of motion in combination with observations (measurements) of elements of the state vector at the current time. These observations (measurements) can include for example radar measured positions, speeds, and direction angles, as well as camera position angles.

Successive 2-D positional data from the camera tracking combined with radar tracking can be used to construct a trace of object movement in the camera's perspective view. The positional data can also be used to construct an animation of the trajectory for example to enhance a television production of a sporting event.

If selected by an operator, the video processing software 0006 can generate a modified video feed that may include an overlay of a graphical trace of a sequence of position data of the object 0009 which can typically be a series of independent or connected dots or lines on the original video images, as well as other data as captions, in combinations. The video processor 0005 output can also include a clean feed of the camera images to a television broadcast system. The output of the video processor 0005 may be time delayed relative to the real time events to allow for the required processing time.

The present subject matter can be used by a television broadcaster at a sporting event such as a golf tournament. The configured items can be used in the same way and from the same positions that a regular television camera is used to cover golf shots from the tee or from other locations on the golf course.

In one alternative configuration of the subject matter the radar 0001 can be mounted on a separate, motorized tripod that is driven in a "slave" manner that follows the movements of the camera tripod. In another alternative configuration the radar can be combined with a portable television broadcast camera that does not make use of a tripod. In another alternative configuration the camera and radar may be operated independently of each other by combining them with one of more inertial navigation sensors that provide measurements of their respective positions and attitudes relative to each other.

The present inventive subject matter can be applied to other sports including a ball or other objects that whose movement and trajectory can be tracked by a 3-D Doppler radar, for television display or for other purposes.

Figure 9:
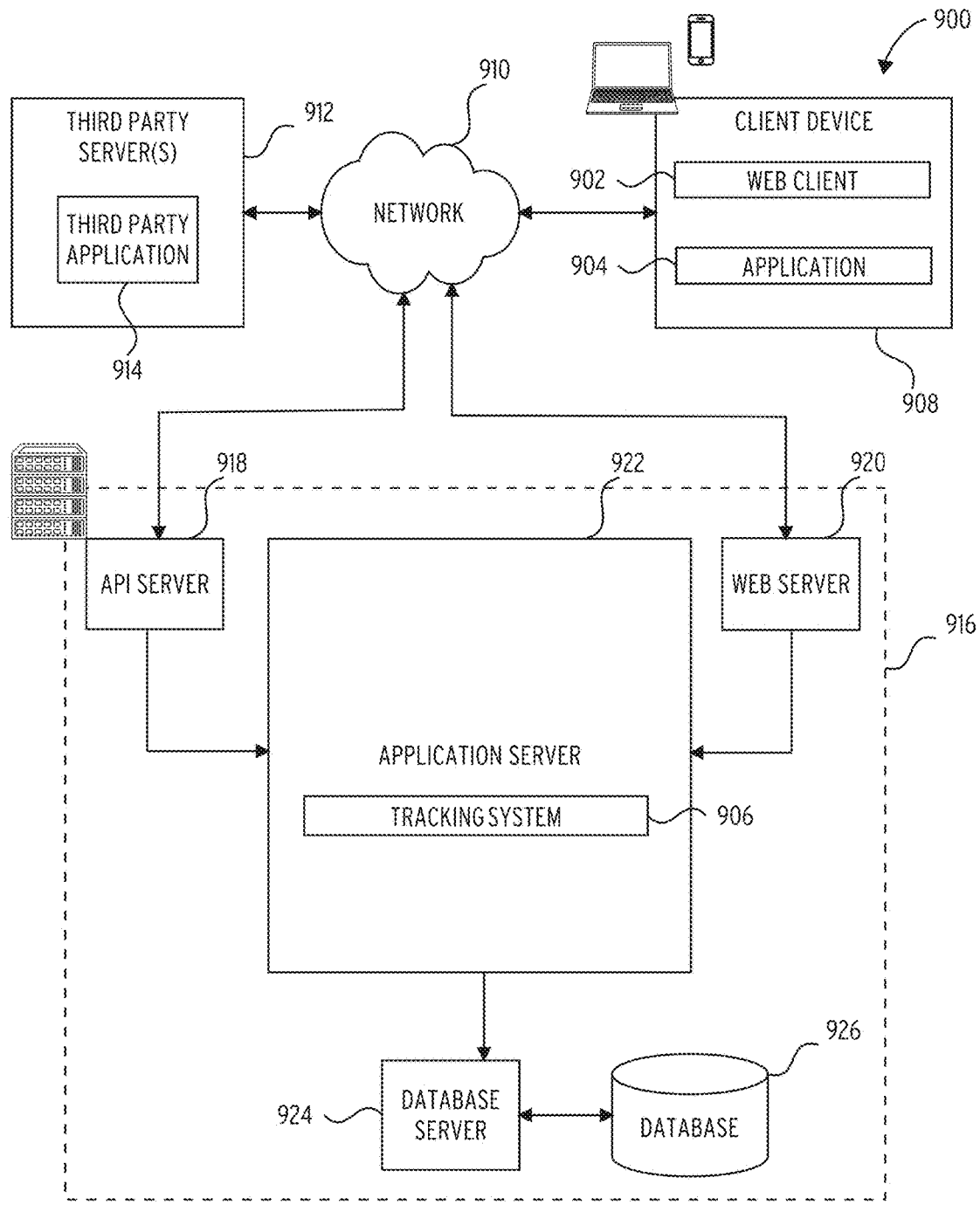
FIG. 9 is a block diagram illustrating a networked system, according to some example embodiments.

With reference to FIG. 9, an example embodiment of a high-level SaaS network architecture 900 is shown. A networked system 916 provides server-side functionality via a network 910 (e.g., the Internet or wide area network (WAN)) to a client device 908. A web client 902 and a programmatic client, in the example form of an application 904 are hosted and execute on the client device 908. The networked system 916 includes and application server 922, which in turn hosts a tracking system 906 that provides a number of functions and services to the application 904 that accesses the networked system 916. The application 904 also provides a number of interfaces described herein, which present output of the tracking and analysis operations to a user of the client device 908.

The client device 908 enables a user to access and interact with the networked system 916. For instance, the user provides input (e.g., touch screen input or alphanumeric input) to the client device 908, and the input is communicated to the networked system 916 via the network 910. In this instance, the networked system 916, in response to receiving the input from the user, communicates information back to the client device 908 via the network 910 to be presented to the user.

An Application Program Interface (API) server 918 and a web server 920 are coupled to, and provide programmatic and web interfaces respectively, to the application server 922. The application server 922 hosts a tracking system 906, which includes components or applications. The application server 922 is, in turn, shown to be coupled to a database server 924 that facilitates access to information storage repositories (e.g., a database 926). In an example embodiment, the database 926 includes storage devices that store information accessed and generated by the tracking system 906.

Additionally, a third party application 914, executing on a third party server 912, is shown as having programmatic access to the networked system 916 via the programmatic interface provided by the Application Program Interface (API) server 918. For example, the third party application 914, using information retrieved from the networked system 916, may support one or more features or functions on a website hosted by the third party.

Turning now specifically to the applications hosted by the client device 908, the web client 902 may access the various systems (e.g., tracking system 906) via the web interface supported by the web server 920. Similarly, the application 904 (e.g., an "app") accesses the various services and functions provided by the tracking system 906 via the programmatic interface provided by the Application Program Interface (API) server 918. The application 904 may, for example, an "app" executing on a client device 908, such as an iOS or Android OS application to enable user to access and input data on the networked system 916 in an off-line manner, and to perform batch-mode communications between the programmatic client application 904 and the networked system networked system 916.

Further, while the SaaS network architecture 900 shown in FIG. 9 employs a client-server architecture, the present inventive subject matter is of course not limited to such an architecture, and could equally well find application in a distributed, or peer-to-peer, architecture system, for example. The tracking system 906 could also be implemented as a standalone software program, which do not necessarily have networking capabilities.

Figure 10:
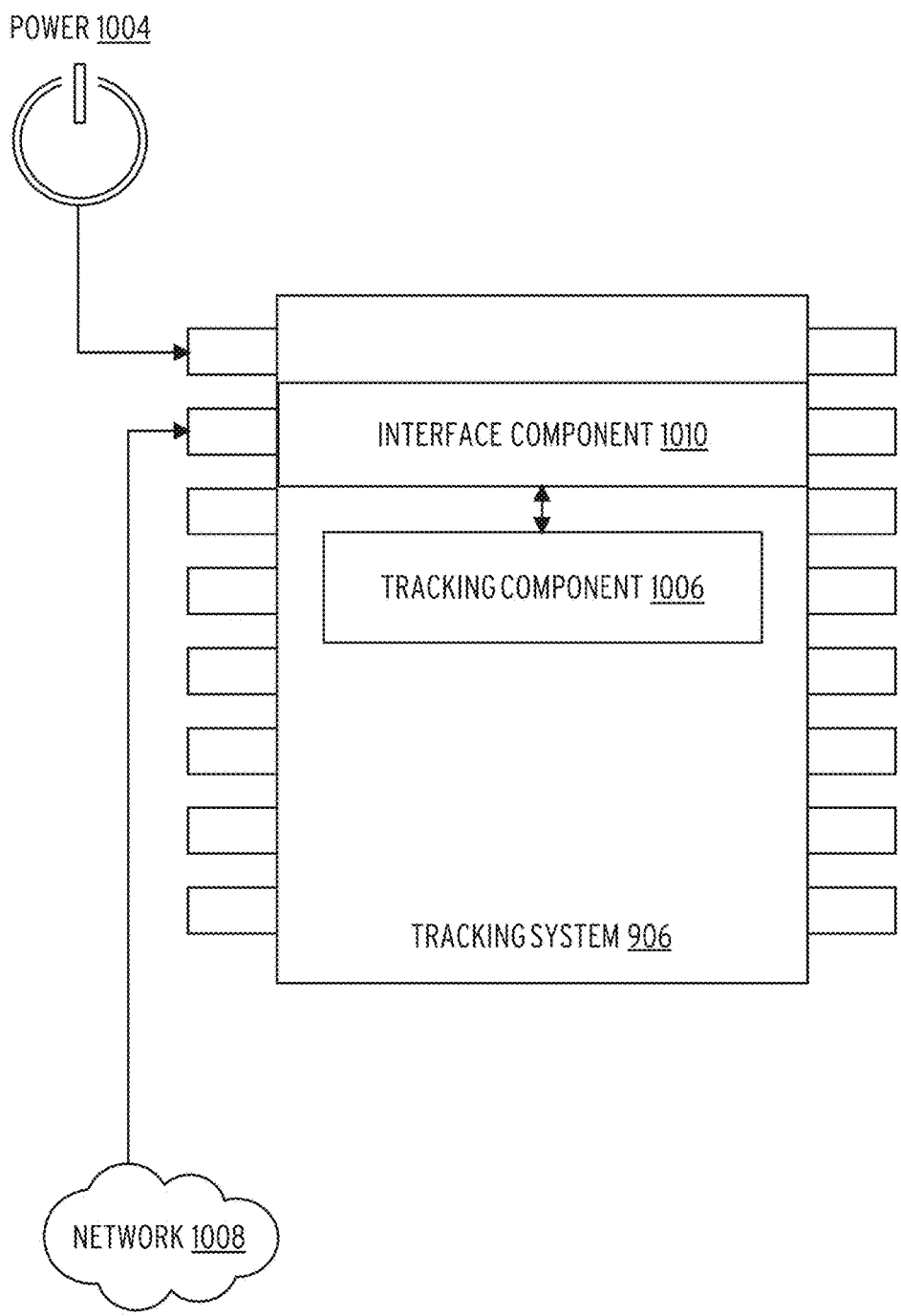
FIG. 10 is a block diagram showing some details of a tracking system, according to some example embodiments.

FIG. 10 is a block diagram showing for the architectural details of a tracking system 906, according to some example embodiments. Specifically, the tracking system 906 is shown to include an interface component 1010 by which the tracking system 906 communicates (e.g., over the network 1008) with other systems within the SaaS network architecture 900. The interface component 1010 is collectively coupled to a Tracking component 1006 that operates to perform one or more operations of the methods described herein.

Figure 11:
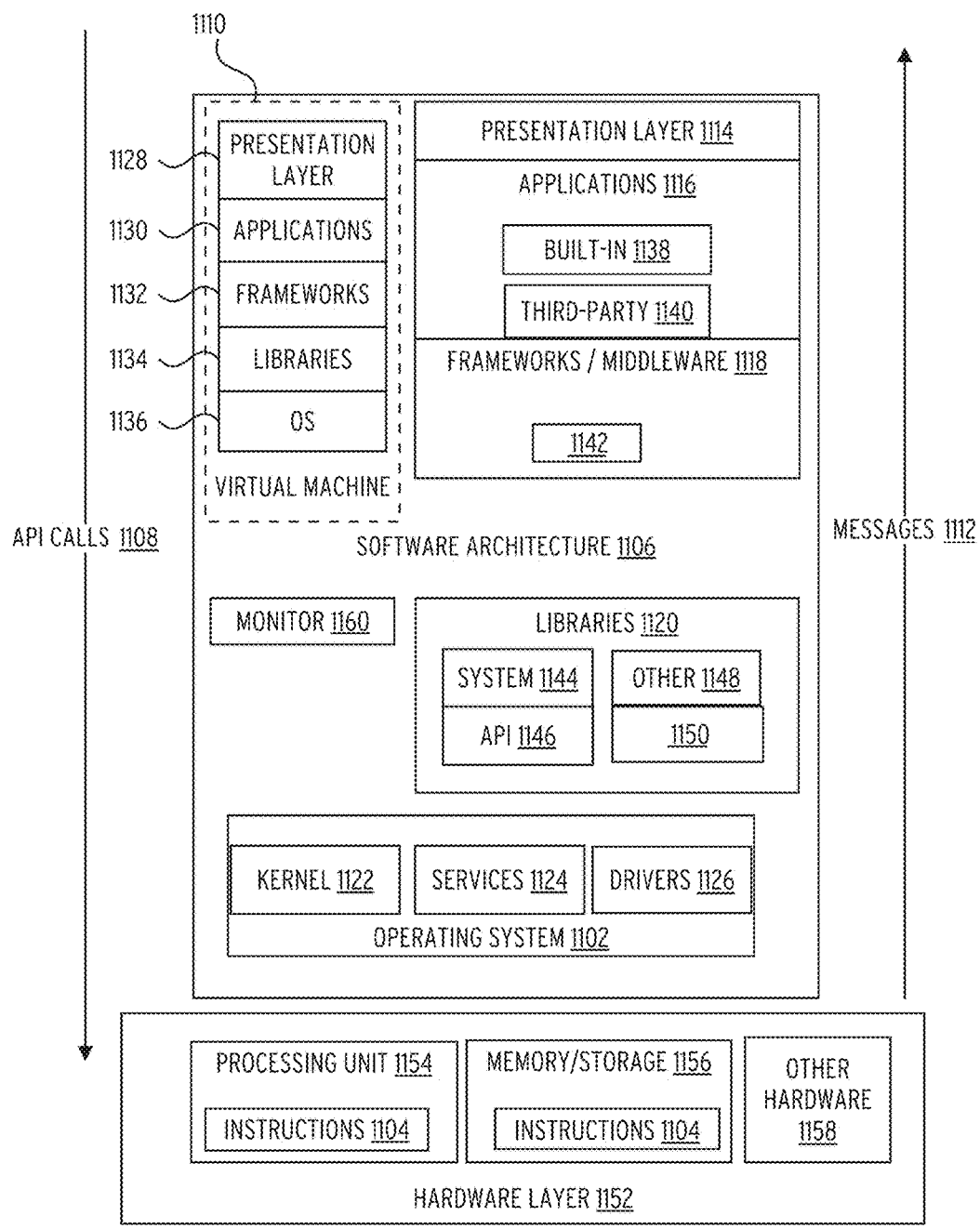
FIG. 11 is a block diagram illustrating representative software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library, and OpenCV libraries) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include any an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Some software architectures use virtual machines. In the example of FIG. 11, this is illustrated by a virtual machine 1110. The virtual machine 1110 creates a software environment where applications/components can execute as if they were executing on a hardware machine (such as the machine 1200 of FIG. 12, for example). The virtual machine 1110 is hosted by a host operating system (operating system (OS) 1136 in FIG. 11) and typically, although not always, has a virtual machine monitor 1160, which manages the operation of the virtual machine as well as the interface with the host operating system (i.e., operating system 1102). A software architecture executes within the virtual machine 1110 such as an operating system operating system (OS) 1136, libraries 1134, frameworks 1132, applications 1130 and/or presentation layer 1128. These layers of software architecture executing within the virtual machine 1110 can be the same as corresponding layers previously described or may be different.

Figure 12:
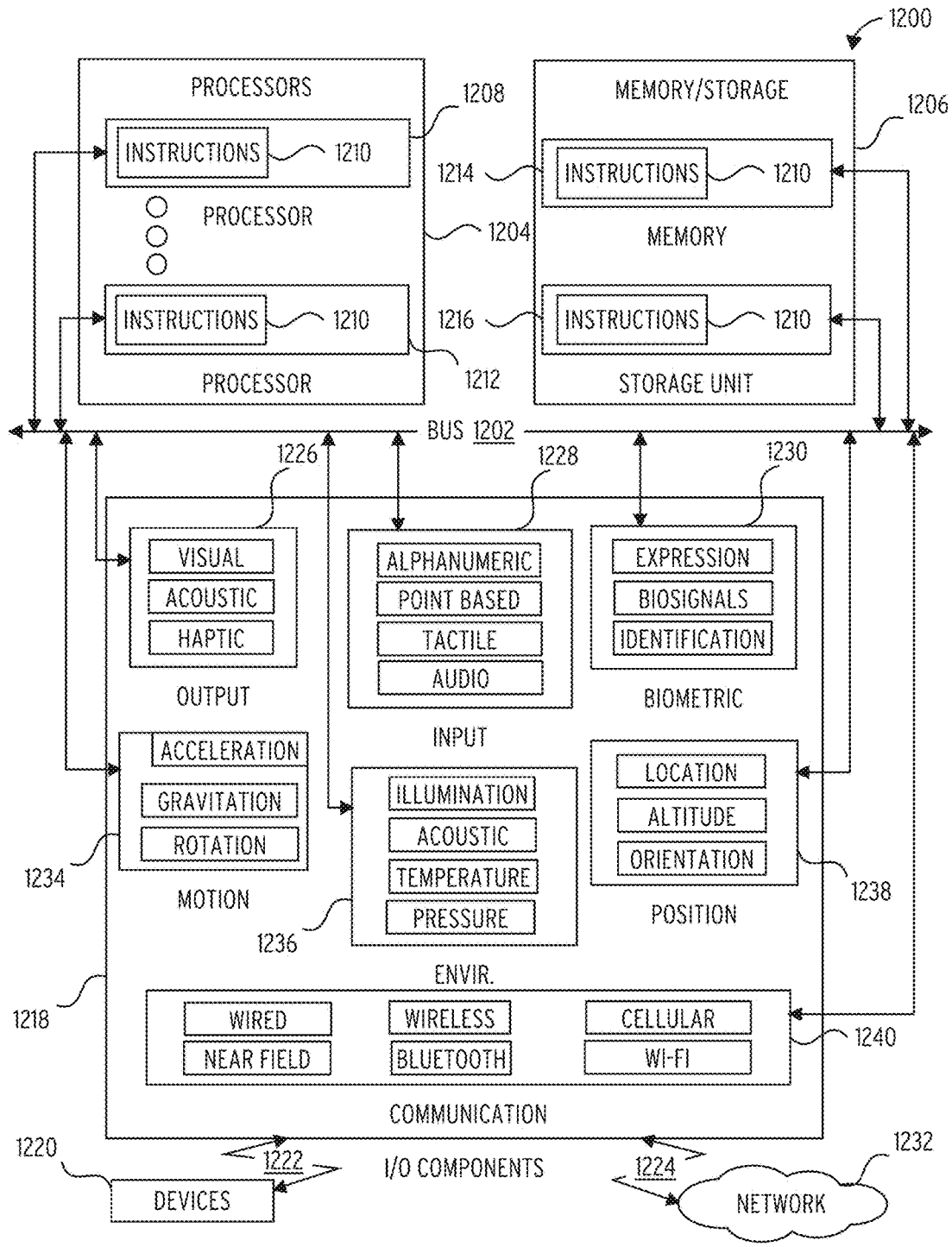
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components processors communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Figure 13:
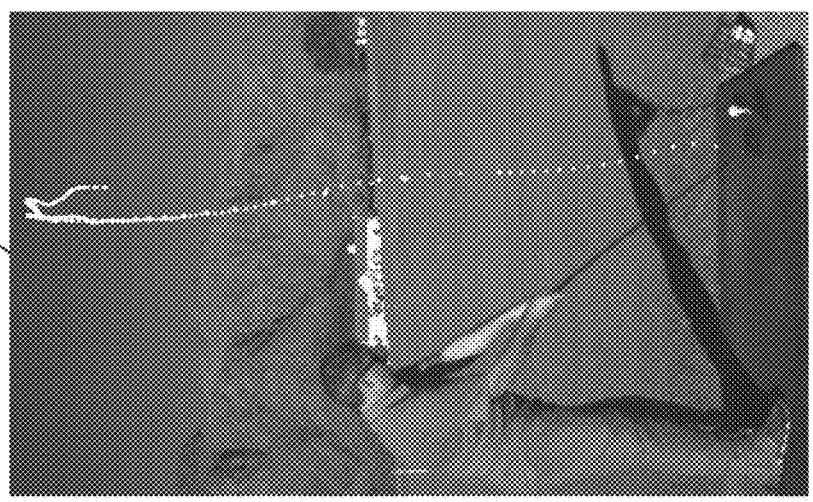
FIG. 13 shows two images depicting simultaneously-captured radar tracking data and camera tracking data for a golf ball, according to some example embodiments.
Figure 13:

FIG. 13 shows a first image 1302 and a second image 1304 depicting simultaneously-captured radar tracking data (with the trace depicted as squares) and camera tracking data (with the trace depicted as circles) of a golf ball, according to some example embodiments.

In the first image 1302 of FIG. 13, the radar tracking data is "off" the camera tracking data by approximately 1 degree. In the second image 1304 of FIG. 13, residual offsets are removed.

A comparison of the first image 1302 and the second image 1304 reveals a number of aspects of the technology, according some example embodiments. Specifically, a comparison of the tracking data shows how the radar tracking data fluctuates due to typical measuring variances, and how the camera tracking data (or camera measurements) are well behaved, and also how camera tracking data provides a number of "spares" in an initial part of the track (e.g., where frame rate not coping with lateral position change rate).

A comparison of the tracking data also highlights how camera tracking data ends in the distance, when the ball becomes impossible to track, but how the radar tracking data continues in the distance beyond the camera. This highlights how the camera and radar technologies described herein may assist each other to address with their respective shortcomings.

The computer-based data processing systems and methods described above are for purposes of example only, and may be implemented in any type of computer system or programming or processing environment, or in a computer program, alone or in conjunction with hardware. The present inventive subject matter may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the present subject matter is not limited to any specific computer language, program, or computer. It is further contemplated that the present subject matter may be run on a stand-alone computer system, or may be run from a server computer system that can be accessed by a plurality of client computer systems interconnected over an intranet network, or that is accessible to clients over the Internet. In addition, many embodiments of the present subject matter have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present subject matter. It should be understood, of course, that the foregoing relates to exemplary embodiments of the invention and that modifications may be made without departing from the spirit and scope of the invention as set forth in the claims further below.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of tracking a moving sports object, the method including:
   calibrating a perspective of an image of a camera to a perspective of a Doppler radar for simultaneous tracking of the moving sports object;
   interpolating a three dimensional trajectory of a camera measurement of the moving sports object's motion using radar data, based at least in part on a failure of one of the two sensors to provide usable measurements during a period that the moving sports object is being tracked; and
   tracking the moving sports object simultaneously with the camera and Doppler radar.

2. The method according to claim 1, further comprising:
   removing offsets or minimizing differences between simultaneous camera measurements and Doppler radar measurements of the moving sports object.

3. The method according to claim 1, further comprising:
   combining a camera measurement of an angular position of the moving sports object with a simultaneous Doppler measurement of a radial distance, speed or other measurement of the moving sports object.

4. The method according to claim 3, further comprising:
   using a camera measurement to replace, augment, correct, or improve a measured angular position or horizontal or vertical position of the moving sports object.

5. A method of tracking a moving sports object, the method including:
   arranging two sensors to track the moving sports object simultaneously;
   combining simultaneous measurements of one or more of a spatial position, a translational velocity, a rotational velocity, a translational acceleration, and/or a rotational acceleration of the moving sports object made by the two sensors simultaneously, wherein one sensor is a Doppler radar and the other sensor is a camera; and
   interpolating a three dimensional trajectory of a camera measurement of the moving sports object's motion using radar data, based at least in part on a failure of one of the two sensors to provide usable measurements during a period that the moving sports object is being tracked.

6. A method of tracking a moving sports object, the method including:
   combining simultaneous measurements of the sports object made by a Doppler radar and a camera;
   using the Doppler radar measurement to predict or identify an actual or expected position of a tracked moving sports object in the camera image; and
   interpolating a three dimensional trajectory of a camera measurement of the moving sports object's motion using radar data, based at least in part on a failure of one of the two sensors to provide usable measurements during a period that the moving sports object is being tracked.

7. A system for tracking a moving sports object, the system comprising:
   processors; and
   a memory storing instructions that, when executed by at least one processor among the processors, cause the system to perform operations comprising:
   calibrating a perspective of an image of a camera to a perspective of a Doppler radar for simultaneous tracking of the moving sports object;
   interpolating a three dimensional trajectory of a camera measurement of the moving sports object's motion using radar data, based at least in part on a failure of one of the two sensors to provide usable measurements during a period that the moving sports object is being tracked; and
   tracking the moving sports object simultaneously with the camera and Doppler radar.

8. The system according to claim 7, wherein the operations further comprise:
   removing offsets or minimizing differences between simultaneous camera measurements and Doppler radar measurements of the moving sports object.

9. The system according to claim 7, wherein the operations further comprise:
   combining a camera measurement of an angular position of the moving sports object with a simultaneous Doppler measurement of a radial distance, speed or other measurement of the moving sports object.

10. The system according to claim 9, wherein the operations further comprise:
    using a camera measurement to replace, augment, correct, or improve a measured angular position or horizontal or vertical position of the moving sports object.

11. A system for tracking a moving sports object, the system comprising:
    processors; and
    a memory storing instructions that, when executed by at least one processor among the processors, cause the system to perform operations comprising:
    receiving data from two sensors tracking the moving sports object simultaneously;
    combining simultaneous measurements of one or more of a spatial position, a translational velocity, a rotational velocity, a translational acceleration, and/or a rotational acceleration of the moving sports object made by the two sensors simultaneously, wherein one sensor is a Doppler radar and the other sensor is a camera; and
    interpolating a three dimensional trajectory of a camera measurement of the moving sports object's motion using radar data, based at least in part on a failure of one of the two sensors to provide usable measurements during a period that the moving sports object is being tracked.

12. A system for tracking a moving sports object, the system comprising:
processors; and
a memory storing instructions that, when executed by at least one processor among the processors, cause the system to perform operations comprising:
combining simultaneous measurements of the sports object made by a Doppler radar and a camera;
using the Doppler radar measurement to predict or identify an actual or expected position of a tracked moving sports object in the camera image; and
interpolating a three dimensional trajectory of a camera measurement of the moving sports object's motion using radar data, based at least in part on a failure of one of the two sensors to provide usable measurements during a period that the moving sports object is being tracked.

13. A non-transitory machine-readable medium comprising instructions that, when read by a machine, cause the machine to perform operations comprising, at least:
calibrating a perspective of an image of a camera to a perspective of a Doppler radar for simultaneous tracking of the moving sports object;
interpolating a three dimensional trajectory of a camera measurement of the moving sports object's motion using radar data, based at least in part on a failure of one of the two sensors to provide usable measurements during a period that the moving sports object is being tracked; and
tracking the moving sports object simultaneously with the camera and Doppler radar.

14. The medium according to claim 13, wherein the operations further comp rise:
removing offsets or minimizing differences between simultaneous camera measurements and Doppler radar measurements of the moving sports object.

15. The medium according to claim 13, wherein the operations further comprise:
combining a camera measurement of an angular position of the moving sports object with a simultaneous Doppler measurement of a radial distance, speed or other measurement of the moving sports object.

16. The medium according to claim 15, wherein the operations further comprise:
using a camera measurement to replace, augment, correct, or improve a measured angular position or horizontal or vertical position of the moving sports object.

* * * * *

UNITED STATES PATENT AND TRADEMARK OFFICE
CERTIFICATE OF CORRECTION

| | | |
|---|---|---|
| PATENT NO. | : 10,338,209 B2 | Page 1 of 1 |
| APPLICATION NO. | : 15/141569 | |
| DATED | : July 2, 2019 | |
| INVENTOR(S) | : Henri Johnson | |

It is certified that error appears in the above-identified patent and that said Letters Patent is hereby corrected as shown below:

On the Title Page

In item (72), in "Inventor", in Column 1, Line 1, after "(US)", insert --¶(73) Assignee: EDH US LLC, Orlando, FL (US)--

In the Claims

In Column 28, Line 8, in Claim 14, delete "comp rise:" and insert --comprise:-- therefor Signed and Sealed this
Fourteenth Day of April, 2020

Andrei Iancu
*Director of the United States Patent and Trademark Office*